(12) United States Patent  
Metzger et al.

(10) Patent No.: US 8,919,492 B2
(45) Date of Patent: Dec. 30, 2014

(54) ADSORPTION UNIT AND ABSORPTION MUFFLER OF AN INTAKE MANIFOLD OF AN INTERNAL COMBUSTION ENGINE

(75) Inventors: Michael Metzger, Waiblingen (DE); Calogero Colletto, Filderstadt (DE); Johannes Stuerner, Sindelfingen (DE); Armin Ludmann, Gerlingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 215 days.

(21) Appl. No.: 13/489,722

(22) Filed: Jun. 6, 2012

(65) Prior Publication Data
US 2012/0304629 A1    Dec. 6, 2012

(30) Foreign Application Priority Data

Jun. 6, 2011  (DE) .......................... 10 2011 104 630

(51) Int. Cl.
| | | |
|---|---|---|
| *B01D 53/04* | (2006.01) | |
| *F01N 3/00* | (2006.01) | |
| *F01N 3/021* | (2006.01) | |
| *F02M 35/104* | (2006.01) | |
| *F02M 35/12* | (2006.01) | |
| *F02M 35/14* | (2006.01) | |
| *F02M 33/04* | (2006.01) | |

(52) U.S. Cl.
CPC ........... *F02M 35/1266* (2013.01); *Y02T 10/126* (2013.01); *F02M 33/043* (2013.01); *F02M 35/1272* (2013.01)
USPC ............ 181/214; 181/212; 181/252; 181/256

(58) Field of Classification Search
USPC .................................. 181/212, 252, 256, 214
See application file for complete search history.

(56) References Cited

U.S. PATENT DOCUMENTS

| 7,520,258 B2 | 4/2009 | Choi | |
|---|---|---|---|
| 7,621,372 B2 | 11/2009 | Yamaura et al. | |
| 8,485,311 B2 * | 7/2013 | Mackenzie et al. ........... | 181/229 |
| 2010/0089368 A1 * | 4/2010 | Hirata et al. .................. | 123/518 |
| 2011/0011670 A1 | 1/2011 | Ishida et al. | |

FOREIGN PATENT DOCUMENTS

DE       202006007096 U1    9/2007

* cited by examiner

*Primary Examiner* — Thomas Denion
*Assistant Examiner* — Brandon Lee
(74) *Attorney, Agent, or Firm* — James Hasselbeck

(57) ABSTRACT

An adsorption unit for combustion gas of an internal combustion engine has an adsorption housing having a chamber section with an inner wall. An adsorption element disposed in the adsorption housing is made of a gas-permeable adsorption medium that is formed to a hollow body and encloses an interior of the adsorption element. The hollow body has opposed open ends. A main flow passage extends through the hollow body and the combustion gas flows in main flow direction through the hollow body. The adsorption element has an exterior circumferential side facing away from the interior and delimiting together with the inner wall of the chamber section a bypass chamber surrounding the adsorption element outwardly. In the main flow direction, the bypass chamber has a downstream end that is closed off and an upstream end that has at least one bypass opening that communicates with the main flow passage.

7 Claims, 6 Drawing Sheets

ADSORPTION UNIT AND ABSORPTION MUFFLER OF AN INTAKE MANIFOLD OF AN INTERNAL COMBUSTION ENGINE

CROSS REFERENCE TO RELATED APPLICATIONS

This application claims priority from German patent application no. 10 2011 104 630.9, filed Jun. 6, 2011. The entire contents of German patent application no. 10 2011 104 630.9 are incorporated herein by reference and to the fullest extent of the law.

TECHNICAL FIELD

The invention concerns an adsorption unit of an intake manifold for combustion gas of an internal combustion engine.

BACKGROUND OF THE INVENTION

The invention is related to an adsorption unit of an intake manifold for combustion gas of an internal combustion engine, in particular of a motor vehicle, for adsorption of products of incomplete combustion such as hydrocarbons. The adsorption unit is arranged in an intake conduit of the intake manifold and includes an adsorption element made of an adsorption medium that is formed to a hollow body that encloses an interior of the adsorption element and is open at two opposite ends and through which a main flow passage of the combustion gas extends.

Moreover, the invention concerns an absorption muffler of an intake manifold for combustion gas of an internal combustion engine, in particular of a motor vehicle, for muffling intake noise during intake of the combustion gas. The absorption muffler is arranged in an intake conduit of the intake manifold and comprises a muffler element made of a sound-absorbing medium that is formed to a hollow body that encloses an interior of the muffler element and is open at two opposite ends and through which a main flow passage of the combustion gas extends.

Moreover, the invention concerns an intake manifold for combustion gas of an internal combustion engine.

DE 20 2006 007 096 U1 discloses an intake manifold of an internal combustion engine with integrated air filter that is flowed through by inflowing combustion air. After filtration, the combustion air is supplied downstream of the air filter to the cylinder inlets of the internal combustion engine. In order to prevent that after shutdown of the internal combustion engine fuel vapors can flow back through open inlet valves into the intake manifold and are accidentally released into the atmosphere, between the air filter and the cylinder inlets in the intake manifold an adsorption unit is arranged that adsorbs the fuel vapors. The adsorption unit has an adsorption element made of an adsorption medium formed to a hollow cylinder. The adsorption medium delimits an interior with an axial flow passage for the combustion air. When the internal combustion engine is turned off, the hydrocarbons can basically propagate via the axial flow passage also in opposite direction and deposit on the inner boundary walls of the adsorption medium where adsorption takes place. In regular operation, on the other hand, i.e., when the flow of combustion air is guided into the cylinder inlets of the internal combustion engine, desorption of the combustion residues at the inner wall of the adsorption element takes place. In this way, the adsorption element is subjected to regeneration in order to adsorb hydrocarbons again during the next standstill of the internal combustion engine. Over the course of time, however, combustion residues can settle in the radial outer area of the inner side of the adsorption medium so that gradually loading of the adsorption material with hydrocarbons increases and the adsorption capability decreases.

SUMMARY OF THE INVENTION

The invention has the object to design an adsorption unit, an absorption muffler, and an intake manifold of the aforementioned kind in such a way that emissions of the internal combustion engine are reduced permanently and with an efficiency that is as uniform as possible. Preferably, by means of the invention emissions of combustion residues are to be reduced that escape, in particular after shutting down the internal combustion engine, through the cylinder inlets and may propagate through the intake manifold into the environment. Moreover, intake noise emissions generated when taking in combustion gas during operation of the internal combustion engine are to be reduced with the invention.

In accordance with the present invention, this is achieved in that the adsorption element is arranged in an adsorption housing; an exterior circumferential side of the adsorption element facing away from the interior of the adsorption element and an inner wall of a chamber section of the adsorption housing facing the adsorption element delimit a bypass chamber that encloses the adsorption element outwardly in radial direction; the bypass chamber is closed at its end that is positioned downstream relative to the main flow direction and has at least one bypass opening communicating with the main flow passage at its end that is positioned upstream; and the adsorption medium is gas-permeable. The term "combustion gas" means a gas, in particular air, that is supplied to the combustion chamber for combusting the fuel.

According to the invention, a bypass line to the main flow passage of the combustion gas, in particular combustion air, is provided that, relative to the main flow passage of the combustion gas, extends in radial direction from the exterior to the interior through the adsorption medium. The bypass line has a bypass opening to the main flow passage that is located upstream of the adsorption element. The bypass line extends into the bypass chamber that, adjoins the adsorption element in radial direction outwardly.

The fact that upon flow of the combustion gas along the main flow passage an underpressure is created at the inner walls of the intake conduit is advantageously utilized in connection with the adsorption unit according to the invention. The underpressure in the area of the radially inwardly positioned circumferential side of the adsorption element has the effect that combustion gas is sucked away from the bypass chamber through the adsorption element. Combustion gas thus flows from the main flow passage through the bypass opening to the bypass chamber. In this way, during normal operation of the internal combustion engine, a proportion of the combustion gas flows from the main flow passage through the bypass opening into the bypass line.

The proportion of the combustion gas that flows through the bypass line is forcibly guided through the adsorption element because the bypass chamber is closed at one end; accordingly, the combustion gas passes through the adsorption element in radial direction from the exterior to the interior. The combustion gas entrains the hydrocarbons adsorbed at the adsorption element and other particles into the main flow passage and from there to the cylinder inlets. In this way, the adsorption element is automatically regenerated. The entire surface area of the adsorption medium is flowed through by the combustion gas that is flowing through the bypass line so that desorption takes place uniformly within the entire volume of the adsorption medium.

The advantages of the flow passing through the interior of the adsorption element, where the combustion gas in operation of the internal combustion engine flows with minimal pressure loss along the radial inner circumferential side of the adsorption medium, are thus combined with an optimal desorption upon passing through the adsorption medium in radial direction.

Preferably, the adsorption medium is an active carbon filter that has a large adsorption surface area.

Advantageously, the adsorption element can have the shape of a hollow cylinder that is open at both end faces. The chamber section of the adsorption housing can also have the shape of a hollow cylinder. The adsorption element can be arranged coaxially to the chamber section. The coaxial arrangement of hollow cylinders can be realized in a simple way. Advantageously, the adsorption medium can be folded to a closed star shape so that the ratio of volume and active surface area for adsorption is optimized. Such an adsorption element can also be referred to as a star adsorber.

In an advantageous embodiment, axially through the interior of the adsorption element a hollow support body can extend that rests on the adsorption medium at least with sections that are provided with through openings. With the support body, the adsorption medium can be supported in its position in a simple way. In this way, even a shape-unstable adsorption medium that has no sufficiently high inherent stability can be used. Moreover, the adsorption element can be connected with the support body to the intake conduit or the adsorption housing. By means of the through opening, the combustion gas can flow from the bypass chamber into the interior of the adsorption element in operation of the internal combustion engine. When shutting down the internal combustion engine, volatile combustion residues that flow back from the cylinder inlets can pass through the through openings to the adsorption element. Advantageously, the support body can have a tubular section that can be produced in a simple way.

Advantageously, the support body can be connected with a section that is positioned downstream to the adsorption housing and with a section that is positioned upstream can at least partially delimit the bypass opening. In this way, the support body provides a boundary of the bypass chamber at the end face that is positioned downstream. The upstream section of the support body can be free so that it forms a boundary of the bypass opening. However, the upstream section can also be connected to the adsorption housing and the bypass openings can be realized as passages in this section of the support body.

Moreover, advantageously the support body can project past the adsorption element at the side that is positioned upstream. It this way, with the projecting section of the support body an antechamber can be realized at the upstream side of the bypass chamber; with this antechamber the flow of the combustion gas flowing into the bypass chamber can be optimized.

Advantageously, the inner contour of the support body can pass into the inner contours of the sections of the intake conduit upstream and downstream of the adsorption housing. In this way, a uniform flow of the combustion gas along the main flow passage can be realized. Pressure losses and turbulences in the intake conduit are minimized in this way.

In a further advantageous embodiment, the adsorption housing is provided upstream of the adsorption element with a conical flow guiding section that widens in the main flow direction and has a transition into the chamber section; a radial inner section of the flow guiding section delimits the bypass opening at the side that is positioned upstream. With this conical configuration, the flow path of the combustion gas that is branched off by the bypass line is optimized. In this way, turbulences are avoided and pressure losses in the bypass line upon passage of the combustion gas are reduced.

Advantageously, the adsorption unit can at least partially form an absorption muffler of the intake manifold. In this way, the advantages of the adsorption material for adsorption of products of incomplete combustion and its advantages for sound absorption can be optimally combined with each other. In this way, the space requirement of the intake manifold is reduced. The bypass chamber can advantageously be used additionally as a broadband resonator in which a broad frequency range of the intake noise of the combustion gas is muffled in accordance with the resonator principle. By integration of the adsorption unit into the air filter system the space requirement is further reduced. This is in particular advantageously in connection with round air filters because here the mounting space that is available in the clean air space can be used optimally.

The technical object is further solved according to the invention by the absorption muffler in that the sound-absorbing medium is formed, at least partially, of an adsorption medium for adsorption of products of incomplete combustion such as hydrocarbons. In this way, the sound-absorbing properties of the muffler element and the adsorption properties of the adsorption medium are combined optimally and in a space-saving way in a single component. The costs, the manufacturing expenditure, and the mounting expenditure are thus reduced.

In an advantageous embodiment, the absorption muffler can be formed at least partially by the inventive adsorption unit. In this way, the bypass chamber of the adsorption unit according to the invention can act additionally as a broadband resonator. In this way, upon operation of the internal combustion engine an optimal sound absorption and a desorption of products of incomplete combustion can be achieved at the same time by means of the adsorption medium. In particular, the adsorption unit is self-regenerating so that always an optimal desorption of adsorbed pollutant particles is ensured. Moreover, the features and advantages that have been explained above in connection with the adsorption unit according to the invention apply likewise to the absorption muffler.

The technical object is solved according to the invention also by the intake manifold for combustion gas of an internal combustion engine, in particular for a motor vehicle, comprising an adsorption unit according to the invention and/or an absorption muffler according to the invention. The features and advantages disclosed above in connection with the adsorption unit according to the invention and the absorption muffler according to the invention apply likewise to the intake manifold according to the invention.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings. A person of skill in the art will consider the features, disclosed in the drawing, the description and the claims in combination, expediently also individually and combine them to other expedient combinations.

Figure 1:
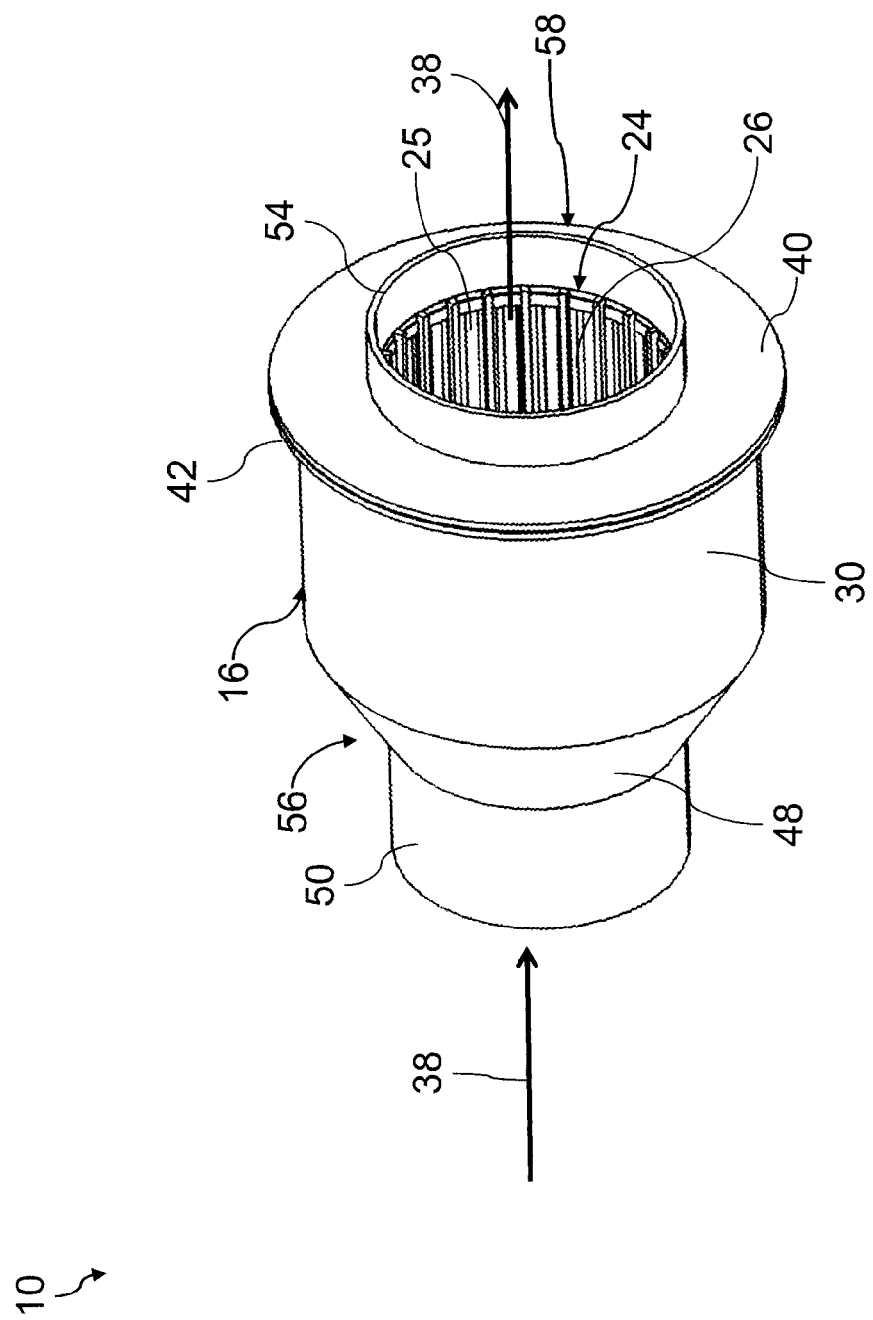
FIG. 1 shows schematically an isometric illustration of an adsorption unit of an intake manifold for combustion gas of an internal combustion engine.

In the figures, same components are referenced with same reference characters. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an adsorption unit and absorption muffler for an air intake system. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 2:
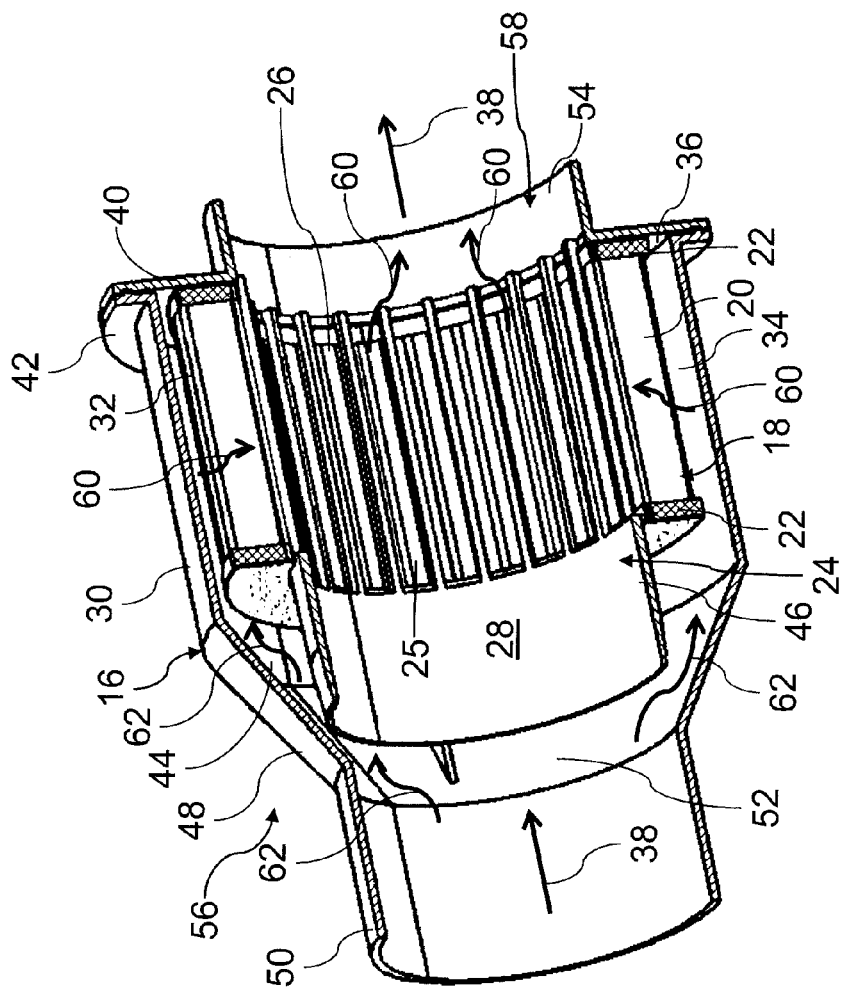
FIG. 2 shows schematically a longitudinal section of the adsorption unit of FIG. 1.
Figure 3:
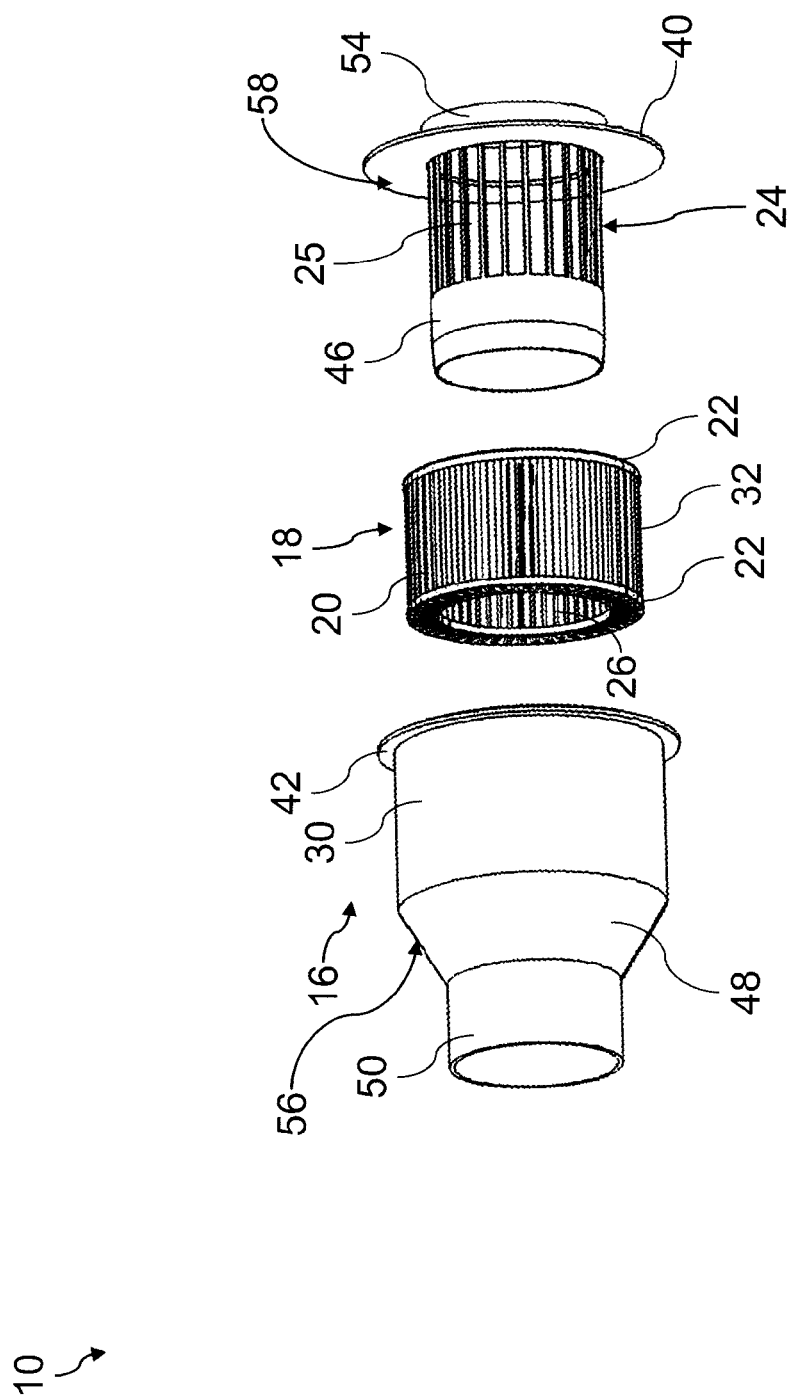
FIG. 3 is an exploded view of the adsorption unit of FIG. 1 and FIG. 2.
Figure 4:
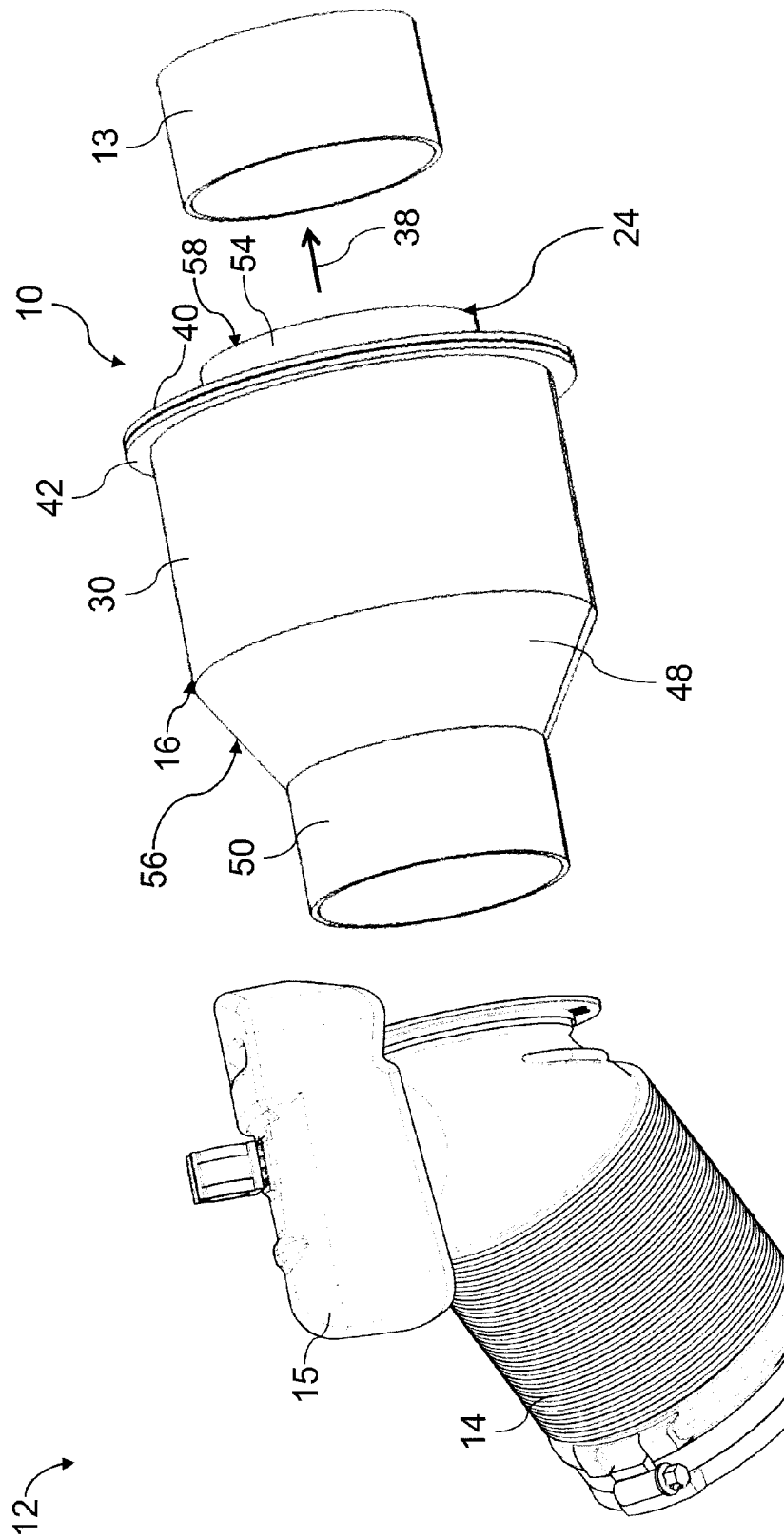
FIG. 4 shows schematically an exploded view of a detail of the intake manifold of the internal combustion engine with the adsorption unit of FIGS. 1 through 3.

In FIGS. 1 through 4, a first embodiment of an adsorption unit 10 of an intake manifold 12 for combustion gas of an internal combustion engine of a motor vehicle is illustrated. A detail of the intake manifold 12 is shown in FIG. 4 in an exploded illustration. The combustion gas is comprised substantially of combustion air. However, a different combustion gas, for example, one that is additionally enriched with oxygen, can be used. The adsorption unit 10 serves for adsorption of hydrocarbons (HC) that, in particular after turning off the internal combustion engine, may flow back from the cylinders into the intake manifold 12. The adsorption unit 10 prevents that the hydrocarbons accidentally escape via the intake manifold 12 into the atmosphere. The adsorption unit 10 is arranged in an intake conduit; FIG. 4 shows a connecting hose 13 and an intake hose 14 of the intake conduit. The intake manifold 12 has moreover a resonator 15, of no interest in this connection, that is connected to the intake hose 14.

The adsorption unit 10 comprises an adsorption housing 16 of rotational symmetry. In the adsorption housing 16 an adsorption element 18 is coaxially arranged.

The adsorption element 18 comprises an adsorption medium 20 that is folded in a zigzag shape and is arranged axially between two end disks 22. The adsorption medium 20 is embedded at both end faces in the respective end disk 22. The adsorption medium 20 is supported at its radial inner side by a support pipe 24.

In the area of the adsorption medium 20 the support pipe 24 is provided with a plurality of axially extending elongate through openings 25 so that it is gas-permeable at these locations.

The adsorption medium 20 forms a cylindrical interior 26 that partially forms a main flow passage 28 for the combustion gas. At the surfaces of the adsorption medium 20 that are facing the interior 26, hydrocarbons are partially or completely adsorbed. The adsorption medium 20 can be comprised of a flat medium such as a gas-permeable nonwoven or an open-pore foam that is coated with or has embedded therein a suitable material for adsorption of hydrocarbons, for example, active carbon or zeolites.

In radial direction, the adsorption medium 20 is positioned between the support pipe 24 and a circular cylindrical chamber section 30 of the adsorption housing 16. An exterior circumferential side 32 of the adsorption element 18 that is facing away from the interior 26 and a radial inner wall of the chamber section 30 that is facing the adsorption element 18 delimit a bypass chamber 34. The bypass chamber 34 surrounds the adsorption element 18 in radial direction outwardly. It is closed off with an annular disk 40 at the end face 36 that is downstream relative to the main flow direction of the combustion gas in regular operation of the internal combustion engine. The annular disk 40 forms a part of the adsorption housing 16. The main flow direction of the combustion gas is indicated by arrows 38 in FIGS. 1, 2, and 4. When in the following the terms "upstream" and "downstream" are used, these terms refer to the main flow direction 38. The annular disk 40 is connected monolithically with the support pipe 24 and extends in radial direction outwardly. It is attached radially outwardly to a connecting flange 42 that is located at the free end of the chamber section 30.

At the upstream end in main flow direction 38, the bypass chamber 34 passes into an antechamber 44. The antechamber 44 is bounded in radial direction inwardly by a support pipe section 46 that projects axially past the adsorption medium 20.

In radial direction outwardly, the antechamber 44 is delimited by a conical flow guide section 48 of the adsorption housing 16. The inner contour of the flow guide section 48, approximately at the level of the upstream end disk 22 of the adsorption element 18, passes into the inner contour of the chamber section 30. At an axial spacing relative to the free rim of the rear support pipe section 46, the inner contour of the flow guide section 48 passes into the inner contour of the upstream connecting section 50 of the adsorption housing 16. An inner cross-section of the connecting section 50 corresponds to an inner cross-section of the intake hose 14 so that their inner contours pass into each other.

The free rim of the upstream support pipe section 46 delimits together with the inner wall of the flow guide section 48 a bypass opening 52 in the form of a circumferentially extending gap. The bypass opening 52 connects the main flow passage 28 with the antechamber 44 and thus with the bypass chamber 34.

The support pipe connecting section 54 of the support pipe 24 projects axially past the adsorption medium 20 at its downstream end face. With the support pipe connecting section 54 the adsorption unit 10 is connected to the connecting hose 13 of the intake conduit. The inner cross-section of the support pipe connecting section 54 corresponds to the inner cross-section of the connecting section 50, the support pipe section 46, and the connecting hose 13. The inner contours of the connecting section 50, the support pipe section 46, and the connecting hose 16 pass into each other.

The adsorption medium 20 has moreover sound-absorbing properties so that the adsorption unit 10 forms an absorption muffler of the intake manifold 12. By means of the absorption muffler, the intake noise upon intake of the combustion gas is dampened or muffled across a broad frequency spectrum.

The adsorption unit 10, as shown in FIG. 3, is combined of individual parts. For its manufacture, a housing base member 56 that comprises the connecting section 50, the flow guiding section 48, the chamber section 30, and the connecting flange 42 is produced separately. A support body 58 that comprises the support pipe 24 and the annular disk 40 is also separately manufactured. The adsorption element 18 with the adsorption medium 20 and the end disks 22 is also produced separately.

The adsorption element 18 is pushed in axial direction onto the support pipe section 46 of the support pipe 24 so that the upstream end disk 22 rests against the annular disk 40 and the through openings 25 are located in the area of the adsorption medium 20.

The support body 48 with the adsorption element 18 is inserted in axial direction so far into the opening of the chamber section 30 of the housing base member 56 until the annular disk 40 is resting against the connecting flange 42. The annular disk 40 and the connecting flange 42 are fused (welded) or glued to each other.

The function of the adsorption unit 10 will be disclosed in the paragraphs following.

When turning off the internal combustion engine, volatile hydrocarbons can pass from the cylinders of the internal combustion engine into the intake manifold 12. The volatile hydrocarbons are adsorbed at the adsorption medium 20 so that the hydrocarbons cannot escape into the atmosphere.

Upon operation of the internal combustion engine, combustion gas is aspirated in the main flow direction 38 along the main flow passage 28 of the adsorption unit 10 into the cylinders. This creates underpressure at the inner walls of the adsorption unit 10.

In the area of the through openings 25 of the support pipe 24, the underpressure has the effect that combustion gas from the bypass chamber 34 is sucked in, indicated in FIG. 2 by arrows 60, radially from the exterior to the interior through the adsorption medium 20. Through the bypass opening 52 a proportion of the combustion gas flows from the main flow passage 28, indicated by arrows 62, through the antechamber 44 into the bypass chamber 34. The flow within the antechamber 44 is optimized by the conical shape of the flow guiding section 48 with respect to minimization of pressure losses in the adsorption unit 10. As it passes through the adsorption medium 20, the combustion gas causes desorption of the adsorbed hydrocarbons and entrains the desorbed hydrocarbons and combines them with the main flow of the combustion gas at a location downstream of the bypass opening 52. The desorbed hydrocarbons are supplied to the cylinders together with the combustion gas.

In operation of the internal combustion engine the bypass chamber 34 and the antechamber 44 act additionally as a broadband resonator for damping the intake noise of the combustion air during intake in accordance with the resonator principle. The adsorption medium 20 acts as an absorption muffler with which the intake noise is reduced according to the absorption principle.

Figure 5:
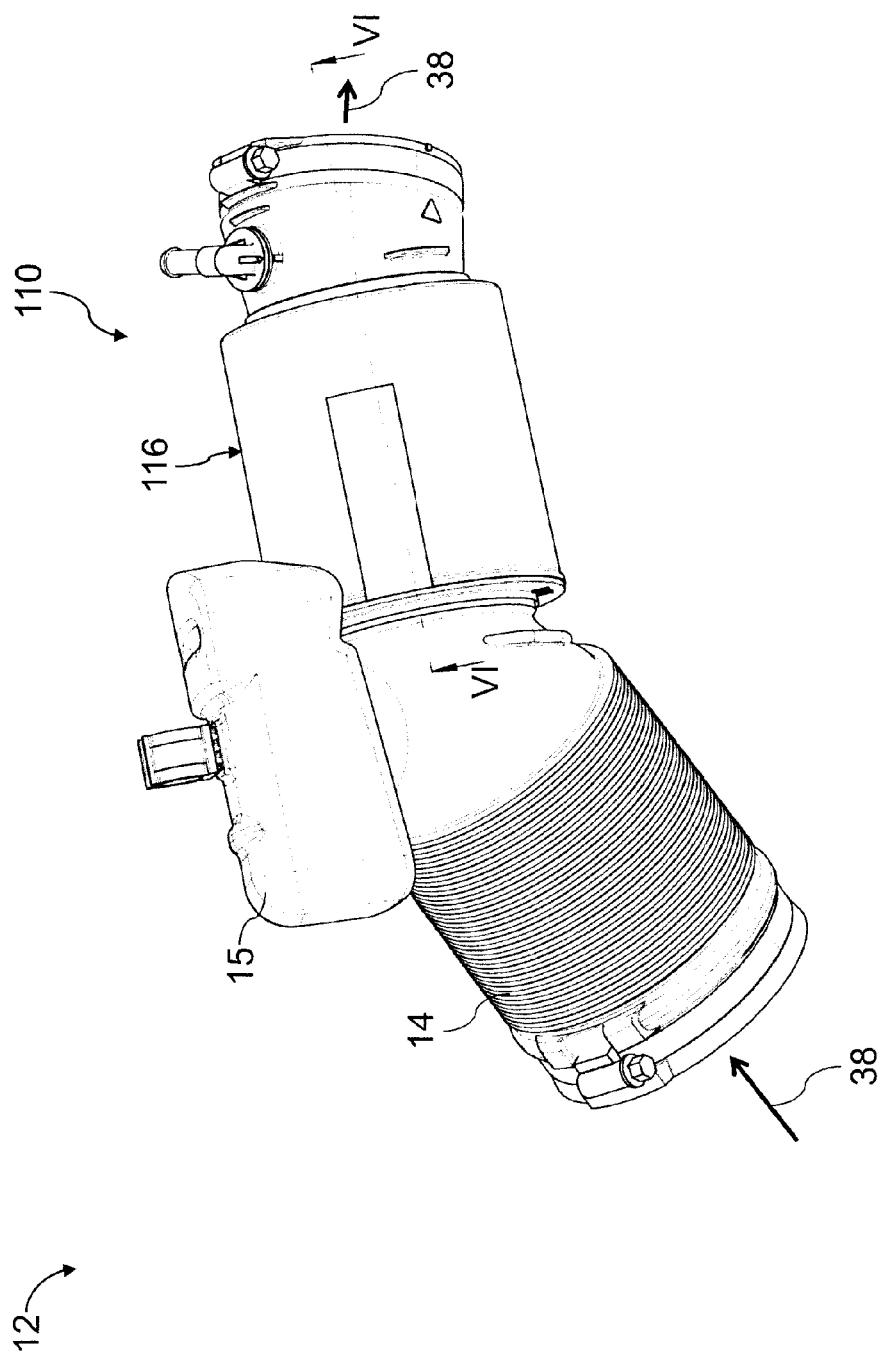
FIG. 5 shows a detail of a second embodiment of an intake manifold of an internal combustion engine similar to the intake manifold to FIG. 4, with an alternative adsorption unit that is similar to the adsorption unit of FIGS. 1 to 4.
Figure 6:
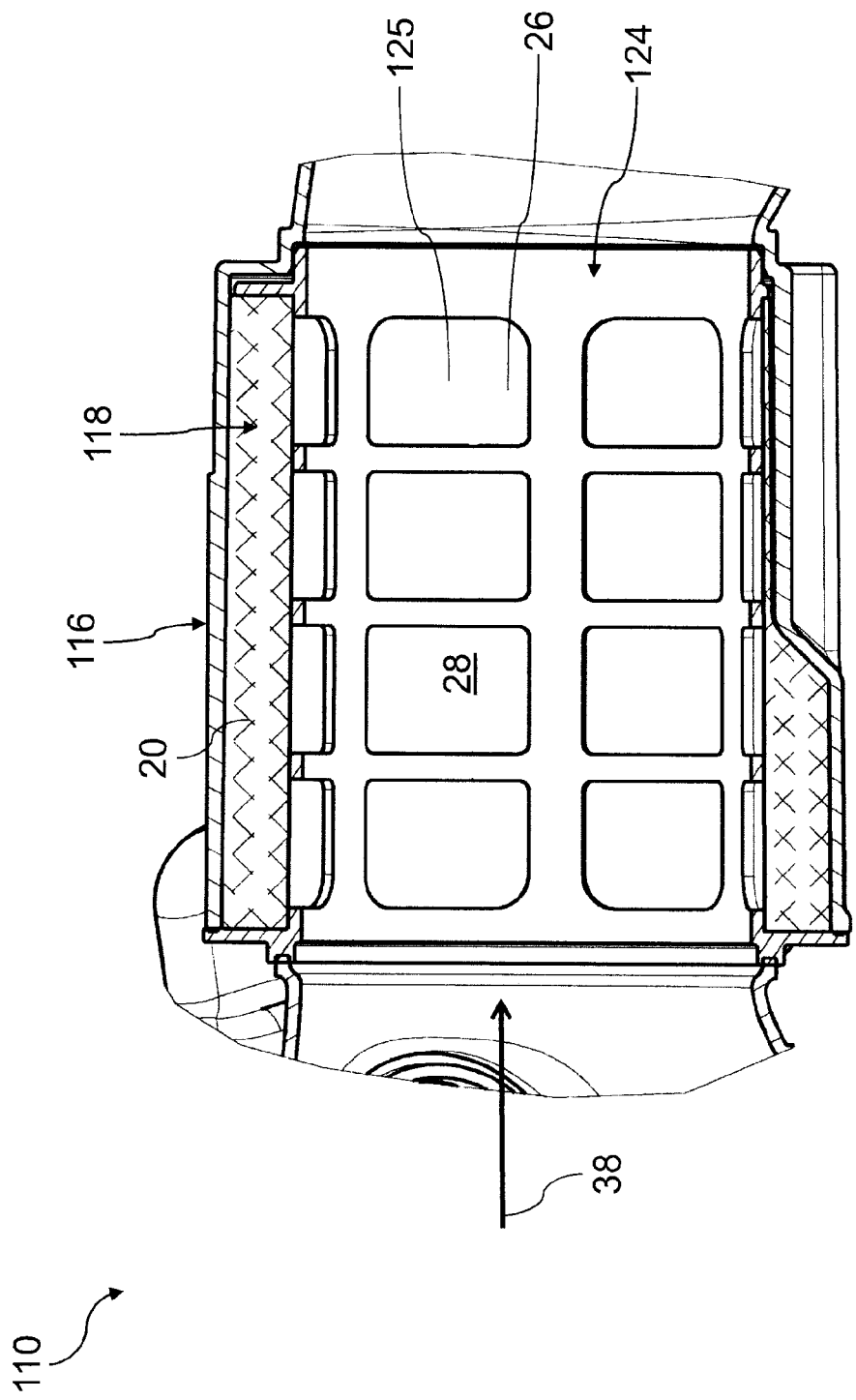
FIG. 6 shows schematically a longitudinal section of the adsorption unit of FIG. 5 along the section line VI-VI of FIG. 5.

In FIG. 5, a detail of the intake manifold 12 with an adsorption unit 110 according to a second embodiment is illustrated. Those elements that are similar to those of the first embodiment of FIGS. 1 to 4 are identified with the same reference numerals having 100 added thereto. The second embodiment differs from the first embodiment in that the adsorption unit 110, as in particular illustrated in FIG. 6 in section, has no bypass chamber, no antechamber, and no bypass opening to the main flow passage 28. The radial exterior circumferential side of the adsorption element 18 adjoins directly the inner circumferential side of the adsorption housing 116.

The adsorption medium 20 is sound-absorbing and adsorbs volatile hydrocarbons. With the adsorption unit 10, in analogy to the first embodiment of FIGS. 1 to 4, hydrocarbons that flow back from the cylinders upon standstill of the internal combustion engine are adsorbed. In operation of the internal combustion engine, the adsorbed hydrocarbons are then desorbed by the combustion gas flowing in the main flow direction 38 from the radial inner side of the adsorption medium 20. Intake noise caused by the sucked-in combustion gas are dampened or muffled by the adsorption medium 20 in accordance with the principle of sound absorption across a broad frequency spectrum.

In all of the above described embodiments of an adsorption unit 10; 110 and an intake manifold 12 the following modifications are possible inter-alia.

The invention is not limited to adsorption units in intake manifolds of internal combustion engines of motor vehicles. Instead, it can also be used in other kinds of internal combustion engines, for example, industrial motors.

In the adsorption unit 10 according to the first embodiment of FIGS. 1 to 4, it is also possible to employ an adsorption medium that has only adsorbing properties without a sound-absorbing effect.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An adsorption unit for combustion gas of an internal combustion engine for adsorption of products of incomplete combustion, the adsorption unit configured to be arranged in an intake conduit of an intake manifold, the adsorption unit comprising:
    an adsorption housing having a chamber section with an inner wall;
    an adsorption element disposed in said adsorption housing;
    said adsorption element comprised of a gas-permeable adsorption medium;
    wherein said adsorption unit forms at least a portion of the intake conduit of the intake manifold of the internal combustion engine;
        wherein the gas-permeable adsorption medium is a gas-permeable flat medium that is coated with or has embedded therein a hydrocarbon adsorption material selected from the group active carbon or zeolites;
        wherein the gas-permeable flat medium is an axially extending hollow body radially enclosing an interior of said adsorption element;
    wherein said hollow body has axially opposed open ends and a main flow passage of the combustion gas extends through said hollow body and the combustion gas flows in a main flow direction through said hollow body;
    wherein said adsorption element includes an exterior circumferential side facing away from said interior;
    wherein said exterior circumferential side and said inner wall of said chamber section delimit a bypass chamber surrounding said absorption element outwardly in a radial direction;
    wherein said bypass chamber includes a downstream end in said main flow direction and said downstream end is closed off;
    wherein said bypass chamber includes an upstream end in said main flow direction;
    wherein said upstream end has at least one bypass opening that communicates with said main flow passage;
    a hollow support body including:
        an axially elongated support pipe extending axially through said interior of said adsorption element, the support pipe having two opposing open axial ends;
        a radially extending annular disk arranged on and circumferentially encircling a radially outer side of said axially elongated support pipe;
        wherein said support pipe extends through and axially outwardly beyond said radially extending annular disk to the exterior of the adsorption housing;
        wherein said support pipe has a plurality of through openings extending radially through a circumferential outer wall of the support pipe at the interior of said adsorption element; and
        wherein the axially elongated support pipe is received into the interior of the adsorption medium.

2. The adsorption unit according to claim 1, wherein said support body includes a downstream section in said main flow direction and an upstream section in said main flow direction; and
    wherein said downstream section is connected to said adsorption housing and said upstream section at least partially delimits said bypass opening.

3. The adsorption unit according to claim 1, wherein said adsorption element has an upstream section in said main flow direction; and
    wherein said support body projects past said upstream section of said adsorption element in a direction opposite to said main flow direction.

4. The adsorption unit according to claim 1, wherein an inner contour of said support body passes into an inner contour of the intake conduit upstream and downstream of said adsorption housing.

5. The adsorption unit according to claim 1, wherein said adsorption housing, upstream of said adsorption element in said main flow direction, includes a conical flow guide section that widens in said main flow direction and passes into said chamber section;
    wherein a radial inner section of said flow guide section delimits said bypass opening at an upstream side.

6. The adsorption unit according to claim 1,
    wherein the absorption unit is configured as a sound absorption muffler of the air intake manifold for combustion gas of the internal combustion engine.

7. An absorption muffler for combustion gas of an internal combustion engine for muffling intake noise when taking in the combustion gas, wherein the absorption muffler is configured to be arranged in an intake conduit of an intake manifold, the absorption muffler comprising:
    a muffler element of a sound-absorbing medium comprising gas-permeable nonwoven or an open-pore foam;
    wherein said adsorption muffler forms at least a portion of the intake conduit of the intake manifold of the internal combustion engine;
    wherein the sound-adsorbing medium is a hollow body and encloses an interior of said muffler element;
    wherein said hollow body has opposed open ends and a main flow passage of the combustion gas extends through said hollow body and the combustion gas flows in a main flow direction through said hollow body;
    wherein said sound-absorbing medium is at least partially formed of an adsorption medium for adsorption of products of incomplete combustion;
    an adsorption housing having a chamber section with an inner wall;
    an adsorption element disposed in said adsorption housing;
    said adsorption element comprised of a gas-permeable adsorption medium;
        wherein the gas-permeable adsorption medium is a gas-permeable flat medium that is coated with or has embedded therein a hydrocarbon adsorption material selected from the group active carbon or zeolites;
        wherein the gas-permeable flat medium is an axially extending hollow body radially enclosing an interior of said adsorption element;
    wherein said hollow body has axially opposed open ends and a main flow passage of the combustion gas extends through said hollow body and the combustion gas flows in a main flow direction through said hollow body;
    wherein said adsorption element includes an exterior circumferential side facing away from said interior;
    wherein said exterior circumferential side and said inner wall of said chamber section delimit a bypass chamber surrounding said absorption element outwardly in a radial direction;
    wherein said bypass chamber includes a downstream end in said main flow direction and said downstream end is closed off;
    wherein said bypass chamber includes an upstream end in said main flow direction;

wherein said upstream end has at least one bypass opening that communicates with said main flow passage;

a hollow support body including:
- an axially elongated support pipe extending axially through said interior of said adsorption element, the support pipe having two opposing open axial ends;
- a radially extending annular disk arranged on and circumferentially encircling a radially outer side of said axially elongated support pipe;
- wherein said support pipe extends through and axially outwardly beyond said radially extending annular disk to the exterior of the adsorption housing;
- wherein said support pipe has a plurality of through openings extending radially through a circumferential outer wall of the support pipe at the interior of said adsorption element; and
- wherein the axially elongated support pipe is received into the interior of the adsorption medium.

\* \* \* \* \*